United States Patent [19]

Andre

[11] Patent Number: 4,587,406

[45] Date of Patent: May 6, 1986

[54] APPARATUS FOR CONTROLLING THE COOKING PROCESS IN A COOKING VESSEL

[75] Inventor: Wolfram K. Andre, Aichwald, Fed. Rep. of Germany

[73] Assignee: Kurt Wolf & Co. KG, Fed. Rep. of Germany

[21] Appl. No.: 695,970

[22] Filed: Jan. 29, 1985

[30] Foreign Application Priority Data

Feb. 17, 1984 [DE] Fed. Rep. of Germany ....... 3405731

[51] Int. Cl.⁴ .............................................. H05B 1/02
[52] U.S. Cl. ..................................... 219/497; 219/492; 219/518; 219/452; 219/508; 99/332; 99/328; 340/589
[58] Field of Search ............... 219/508, 413, 506, 501, 219/497, 452, 453, 492, 518; 340/582, 588, 589; 99/328, 332, 331

[56] References Cited

U.S. PATENT DOCUMENTS

| | | | |
|---|---|---|---|
| 4,403,302 | 9/1983 | Young et al. | 219/492 |
| 4,433,232 | 2/1984 | Tachikawa et al. | 219/497 |
| 4,461,951 | 7/1984 | Luoma, II et al. | 219/497 |
| 4,499,368 | 2/1985 | Payne | 219/492 |

FOREIGN PATENT DOCUMENTS 2161371 6/1973 Fed. Rep. of Germany .
2539746 3/1981 Fed. Rep. of Germany .
3129334 4/1982 Fed. Rep. of Germany .

*Primary Examiner*—M. H. Paschall
*Attorney, Agent, or Firm*—Thomas W. Speckman

[57] ABSTRACT

An apparatus for monitoring the cooking process in a cooking vessel placed on an electric heating element, particularly a stovetop burner, comprising signal transmitter controlled by the temperature in the cooking vessel, a signal receiver in communication with the signal transmitter by a transmitter for activating a control circuit to adjust the heat output of the heating element, and a switch for turning the apparatus on and off. During the entire cooking operation and when the heating element is set at full heating capacity, a periodical surveillance is effected to determine whether the temperature varies, remains steady or decreases. If a temperature increase is measured during a monitoring cycle, the heating element is not turned off, but if the temperature remains constant or falls, the heating element is turned off.

14 Claims, 1 Drawing Figure

U.S. Patent May 6, 1986 4,587,406
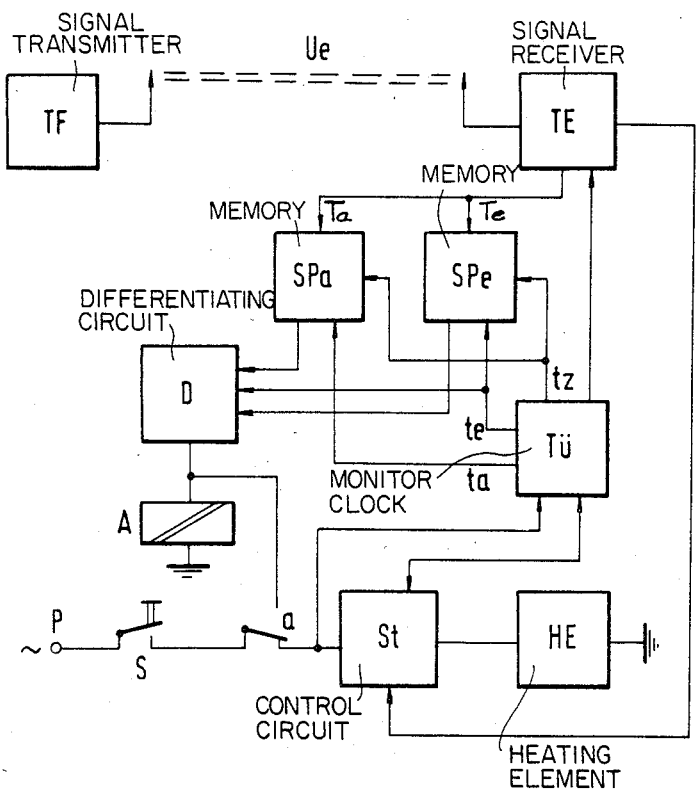

APPARATUS FOR CONTROLLING THE COOKING PROCESS IN A COOKING VESSEL

BACKGROUND OF THE INVENTION

1. Field of the Invention

The present invention relates to an apparatus for controlling the cooking process in a cooking vessel placed on an electric heating element, particularly a stovetop burner, having a signal transmitter controlled by the temperature in the cooking vessel, a signal receiver in communication with the signal transmitter by transmitting means for activating a control circuit to adjust the heat output of the heating element, and a switch for turning the device on and off.

2. Description of the Prior Art

Apparatus of this general type are known and are distinguished from one another by the use of different sensor means in the signal transmitters to measure the temperature and of different methods and means for generating and transmitting signals to the signal receiver, as disclosed by German Patent Publication DE-AS No. 21 61 371, German Patent Publication DE-PS No. 25 39 746 and German Patent Publication DE-OS No. 31 29 334, for example.

Since the cooking vessel is not unitary with the heating element, there is the danger in the prior art apparatus that the cooking vessel is placed upon a first heating element while a second heating element is turned on and is heating up. However, the signal receiver fails to register the heating up of the second heating element so that the second heating element continues to receive current and eventually operates at its full capacity heat output while no heat is actually being used for heating a cooking vessel. Since the heat emitted by the second heating element is merely radiating, there is the danger that this heating element will become overloaded and burn out.

A similar situation arises when, during a preset cooking program, the cooking vessel is being removed from the heating element and set aside without turning off the control for the heating element. Impermissible loads may also result when two heating elements having preset cooking programs are activated, and the cooking vessels are accidentally interchanged on the heating elements.

SUMMARY OF THE INVENTION

It is an object of this invention to provide an apparatus of the kind referred to above by which any overloading of the heating element or any impermissible overheating of the food in a cooking vessel is prevented during the entire cooking operation in the event that the cooking vessel has inadvertently been placed on the wrong heating element, that a cooking vessel is removed from the heating element during the cooking operation while maintaining the control for the heating element in the ON position, or that several cooking vessels have been interchanged and placed on heating elements having different or like programs.

This is accomplished according to the present invention in that a periodic monitoring of the switch position of the control circuit of the heating element is initiated as the ON switch is actuated, that at the beginning of each monitoring cycle it is determined whether the heating element has been set by the control circuit to a full capacity or reduced heat output, that in the case of full capacity heat output the temperature value supplied by the signal receiver at the beginning of a monitoring cycle is stored, that at the end of the monitoring cycle this stored temperature value is compared with the temperature value supplied by the signal receiver at the end of the monitoring cycle, and that if the comparison fails to show any change in temperature during the course of the monitoring cycle, then the control circuit of the heating element is turned off at the end of the monitoring cycle.

If, according to this arrangement, the cooking vessel is placed on the wrong heating element during the heating phase of a particular heat output setting, the control circuit of the heating element will be deactivated after the first monitoring cycle because no temperature rise was measured at the end of the monitoring cycle.

When the cooking vessel is removed from a hot heating element during the cooking operation and is set aside, the ensuing cooling off of the cooking vessel causes the control circuit of the heating element to be gradually adjusted to reach its full heat potential so that during the next monitoring cycle the control circuit of the heating element is deactivated because the temperature no longer rises but, instead, falls.

If two cooking vessels are pre-programmed, one for Hold Warm on a first heating element and the other for Quick Cook on a second heating element, for example, but the cooking vessels are accidentally interchanged and are placed on the wrong burners, the first heating element following the heat-up phase will nevertheless move into the regular phase for Hold Warm. The second heating element, following the initial heat-up phase, continues to operate at its top output. The first cooking vessel placed on the second heating element signals "too hot" for the regular phase and, consequently, the control circuit of the first heating element is deactivated. This has the result that no heat will be supplied to the second cooking vessel placed on the first heating element, and this initiates the controlling operation since the temperature in the second cooking vessel fails to rise, and the control circuit for the second heating element is deactivated. Consequently, the first cooking vessel on the second heating element also cools off which causes the control circuit of the first heating element to be activated. The temperature in the first cooking vessel fails to rise and the control circuit for the first heating element is deactivated. Thus, both heating elements are in the OFF position.

Even if both heating elements are pre-programmed with the same program, both heating elements remain in the OFF position when the cooking vessels are interchanged and placed on the wrong heating element. Since complete symmetry as to quantity of water and quantity of food in two cooking vessels is nearly impossible to reach, at any one point in time, the first cooking vessel will have a temperature different from the temperature in the second cooking vessel. If the second cooking vessel is too hot, the temperature will be turned down by the control circuit of the first heating element. Consequently, the full capacity heat output setting is switched on for the second cooking vessel because the second cooking vessel was placed on the first heating element and is cooling off. Further operation to achieve complete deactivation of the control circuits of both heating elements is the same as in the case of interchanged, differently pre-programmed cooking vessels.

Thus, all conceivable sources of error are monitored and in each case any overloading of the heating elements is prevented by timely deactivation of the control circuits, so that food in the cooking vessels is never overheated.

If, according to one embodiment, the control circuit is in the form of a cyclic control arrangement which operates at predetermined switching cycles and at the beginning of each switching cycle presets the period for the next switching cycle, the control signal of the cyclic control circuit indicates activation of the heating element for the entire switching cycle at the beginning of the switch cycle, thereby supplying the requisite signal for the monitoring operation.

Signals for monitoring and deactivating the control circuit of the heating element are derived, according to one embodiment, in that a central monitor clock is provided which is adapted to be activated simultaneously with the ON switch, that this cyclically operating monitor clock scans the control circuit at the beginning of each monitoring cycle for its switch position, that the signal receiver is activated to store in memories the temperature values corresponding to actual temperatures, that at the end of each cycle the differential of the temperature values stored in the memories is obtained by means of a differentiating circuit, and that when a zero or negative temperature differential is measured at the end of the monitoring cycle, a switch is energized which turns off the power supplied to the system by way of the ON switch.

Turning off the power may be accomplished in a very simple manner by the switch causing a contact to open the power supply line to the control circuit of the heating element.

It has been found useful that the contact is adapted to deenergize also the power supply to the monitor clock, the memories, the signal transmitter and the signal receiver, so that the entire system is left without current or voltage.

According to another embodiment, the controlling operation does not interfere with convenient handling of the cooking vessels if the signal receiver, the memories, the differentiating circuit and the monitor clock are associated with the heating element including the control circuit, the signal transmitter is associated with the cooking vessel, and the signal transmitter is in communication with the signal receiver by wireless transmission means.

The device may be further simplified if the monitoring cycle is equal to, or a multiple of, the switching cycle of the control circuit and is synchronized with it.

BRIEF DESCRIPTION OF THE DRAWING

The invention will be further described with reference to an embodiment represented schematically in the FIGURE by a block diagram.

DESCRIPTION OF THE PREFERRED EMBODIMENTS

Sensor means provided at or within the cooking vessel may comprise a temperature sensing probe, for example, which functions as signal transmitter TF and supplies signals over a wireless transmitting means Ue to signal receiver TE, the signals corresponding to the measured temperature. Signal receiver TE is associated with heating element HE having control circuit St. The output of signal receiver TE are supplied in digital form and correspond to the measured temperatures.

Switch S serves to activate and deactivate the entire system. Switch S is connected to the power supply line leading from plug P supplying alternating current voltage to control circuit St and heating element HE. If control circuit St is in the form of a cyclic control circuit, heat output is adjusted depending upon the temperature value supplied by signal receiver TE. To this end, the control circuit, at the beginning of a switch cycle determines the period of time during which the heating element is activated in the next switch cycle. During the activated ON time, the heating element operates at full capacity output. At the beginning of a switch cycle, a signal may be supplied by control circuit St to indicate that heating element HE will operate at full capacity for the duration of the next switch cycle. This particular feature is utilized for the monitoring operation according to the present invention.

Simultaneously with the actuation of switch S, monitor clock Tü is energized. At the beginning of each monitoring cycle tz, clock Tü receives information from control circuit St as to whether the heating element will be set at its full capacity position during the next switching cycle. Upon a positive response, monitor clock Tü causes temperature value Ta supplied to signal receiver TE at this point in time ta to be stored in memory SPa. With a negative response, no further switching action occurs, and the same determination is made at the beginning of the next monitoring cycle. It will be appreciated that the apparatus is further simplified if the monitoring cycle is made to coincide with the switching cycle of control circuit St and is synchronized with it. Temperature value Ta is supplied at the beginning of the monitoring cycle by signal receiver TE and is stored in memory SPa. At the end of the monitoring cycle, temperature value Te, measured at this time te, is stored in memory SPe. Differentiating circuit D ascertains whether zero differential, or a negative differential, ne, is measured, i.e., whether during the previous monitoring cycle the temperature has remained the same or whether it has dropped. A finding of negative or zero differential is interpreted as an indication that the cooking vessel is not correctly associated with respect to heating element HE. Thereupon, switch means A is energized to open the power supply line by means of the normally closed contact of changeover contact a, so that control circuit St and heating element HE are deenergized. Likewise, monitor clock Tü, memories SPa and SPe, signal receiver TE and differentiating circuit D, all associated with heating element HE, are without current.

Signal transmitter TF associated with the cooking vessel, has a power source of its own, such as a battery, because transmitting device Ue is preferably wireless.

As switch means A is energized, the holding circuit for switch means A comprising the contact of changeover switch a and ON switch S is still closed. Heating element HE is maintained in the OFF position until switch S has been deactivated. Renewed turning on of switch S initiates a new cycle of the monitoring operation.

Each time it is determined that for the next switching cycle of control circuit St heating element HE is set to full heating capacity, the temperature values Ta and Te are stored at the beginning and the end, respectively, of the monitoring cycle and the differential is obtained at the end of the monitoring cycle. The type of error responsible for the failure of the temperature to rise is immaterial. Any time the temperature fails to be adjusted, or even decreases, during the course of a monitoring cycle, there is a malfunction in the system and control circuit St of heating element HE is deactivated.

I claim:

1. Apparatus for controlling an electric heating element (HE) for a cooking vessel, comprising: a signal transmitter means (TF) responsive to a temperature sensor means on said cooking vessel measuring the temperature in said cooking vessel; a signal receiver means (TE) in communication with said signal transmitter means (TF); a control circuit means (St) capable of controlling the heat output of said heating element (HE), said control circuit means (St) being capable of monitoring said heating element (HE) during successive monitoring cycles when a first switch means (S) is activated and determining at the beginning of each said monitoring cycle whether said heating element (HE) has been specified to full capacity heat output said control circuit means monitoring said successive monitoring cycles both when said full capacity heat output is and is not specified; a temperature differential circuit means (D) activated by said control circuit means (St) when said full capacity heat output is specified to determine a temperature differential during each said monitoring cycle when said full capacity heat output is specified whereby a first temperature value (Ta) measured by said temperature sensor means at the beginning of each said monitoring cycle is stored in a memory means (SPa) and a second temperature value (Te) measured by said temperature sensor means at the end of each said monitoring cycle is stored in a memory means (SPe) and said first and second temperature values (Ta) and (Te) are compared; and a second switch means (A) activated by said temperature differential means deactivating said heating element when said first and second temperature values (Ta) and (Te) are the same and when said second temperature value (Te) is less than said first temperature value (Ta).

2. Apparatus according to claim 1, wherein said control circuit means (St) is a cyclic control circuit means which operates at predetermined switching cycles and at the beginning of each switching cycle presets the period for the next switching cycle.

3. Apparatus according to claim 2, additionally comprising: a cyclically operating monitor clock means (Tü) activated simultaneously with said first switch means (S) to derive said monitoring cycle, said cyclically operating monitor clock means (Tü) capable of scanning said control circuit means (St) at the beginning of each said monitoring cycle to determine its switch position.

4. Apparatus according to claim 3, wherein said second switch means (A) is capable of activating a contact means (a) opening a power supply line to said control circuit (St) for said heating element (HE).

5. Apparatus according to claim 4, wherein said contact means (a) is additionally capable of deenergizing the power supply for said monitor clock means (Tü), said memory means (SPa, SPe), said signal transmitter means (TF) and said signal receiver means (TE).

6. Apparatus according to claim 5, wherein said signal receiver means (TE), said memory means (SPa, SPe), said differentiating circuit means (D) and said monitor clock means (Tü) are associated with said heating element means (HE) including said control circuit means (St), said signal transmitter means (TF) is associated with said cooking vessel, and said signal transmitter means (TF) is in communication with said signal receiver by wireless transmitting means (Ue).

7. Apparatus according to claim 6, wherein said cyclically operating monitor clock means (Tü) is capable of deriving a monitoring cycle which coincides with the switching cycle preset by said cyclic control circuit means (St) and is synchronized with it.

8. Apparatus according to claim 6, wherein said cyclically operating monitor clock means (Tü) is capable of deriving a monitoring cycle which is a multiple of the switching cycle preset by said cyclic control circuit means (St) and is synchronized with it.

9. Apparatus according to claim 7, wherein said switch means (A) is connected to a holding circuit, comprising said contact means (a) and said first switch means (S).

10. Apparatus according to claim 3, characterized in that said signal receiver means (TE), said memory means (SPa, SPe), said differentiating circuit means (D) and said monitor clock means (Tü) are associated with said heating element means (HE) including said control circuit means (St), that said signal transmitter means (TF) is associated with said cooking vessel, and that said signal transmitter means (TF) is in communication with said signal receiver by wireless transmitting means (Ue).

11. Apparatus according to claim 2, characterized in that said cyclically operating monitor clock means (Tü) is capable of deriving a monitoring cycle which coincides with the switching cycle preset by said cyclic control circuit means (St) and is synchronized with it.

12. Apparatus according to claim 2, characterized in that said cyclically operating monitor clock means (Tü) is capable of deriving a monitoring cycle which is a multiple of the switching cycle preset by said cyclic control circuit means (St) and is synchronized with it.

13. Apparatus according to claim 4, characterized in that said switch means (A) is connected to a holding circuit which includes said contact means (a) and said first switch means (S).

14. Apparatus according to claim 6, characterized in that said switch means (A) is connected into a holding circuit which includes said contact means (a) and said first switch means (S).

* * * * *